US008805116B2

(12) United States Patent
Lin et al.

(10) Patent No.: US 8,805,116 B2
(45) Date of Patent: Aug. 12, 2014

(54) METHODS AND APPARATUS FOR VISUAL SEARCH

(75) Inventors: Zhe Lin, Fremont, CA (US); Jonathan W. Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 109 days.

(21) Appl. No.: 13/434,061

(22) Filed: Mar. 29, 2012

(65) Prior Publication Data

US 2013/0121570 A1 May 16, 2013

Related U.S. Application Data

(60) Provisional application No. 61/535,975, filed on Sep. 17, 2011.

(51) Int. Cl.
*G06F 9/00* (2006.01)
*G06F 17/30* (2006.01)
*G06K 9/46* (2006.01)

(52) U.S. Cl.
CPC ...... *G06F 17/30262* (2013.01); *G06F 17/3025* (2013.01); *G06K 9/4676* (2013.01)
USPC ........................................................ 382/286

(58) Field of Classification Search
None
See application file for complete search history.

(56) References Cited

U.S. PATENT DOCUMENTS

| | | | |
|---|---|---|---|
| 4,790,564 A | 12/1988 | Larcher et al. | |
| 5,579,471 A | 11/1996 | Barber et al. | |
| 5,911,139 A | 6/1999 | Jain et al. | |
| 6,035,055 A * | 3/2000 | Wang et al. | 382/118 |
| 6,480,840 B2 * | 11/2002 | Zhu et al. | 1/1 |
| 6,483,938 B1 | 11/2002 | Hennessey et al. | |
| 6,563,959 B1 | 5/2003 | Troyanker | |
| 6,594,386 B1 * | 7/2003 | Golshani et al. | 382/166 |
| 6,691,126 B1 | 2/2004 | Syeda-Mahmood | |
| 6,757,686 B1 | 6/2004 | Syeda-Mahmood et al. | |
| 6,990,233 B2 | 1/2006 | Park et al. | |
| 7,320,000 B2 | 1/2008 | Chitrapura et al. | |
| 7,702,673 B2 | 4/2010 | Hull et al. | |

(Continued)

FOREIGN PATENT DOCUMENTS

GB          2388761 A    * 11/2003

OTHER PUBLICATIONS

Herve Jegou, Matthijs Douze, Cordelia Schmid. "Improving bag-of-fatures for large scale image search" IEEE, Mar. 15, 2011.*

(Continued)

*Primary Examiner* — Nirav G Patel
*Assistant Examiner* — Oneal R Mistry
(74) *Attorney, Agent, or Firm* — Wolfe-SBMC

(57) ABSTRACT

For each image of a set of images, the each image is characterized with a set of fixed-orientation texture descriptors and a set of color descriptors. The set of images is indexed in a color index and a texture index. Similarly, a query image is characterized with a set of fixed-orientation texture descriptors. The set of fixed orientation texture descriptors of the query image includes a set of fixed orientation descriptors for each of a set of rotated query images, and a set of color descriptors of the query image. A rotated local Bag-of-Features (BoF) operation is performed upon the set of rotated query images and the set of images. Each of the set of images is ranked based on the rotated local Bag-of-Features operation.

20 Claims, 18 Drawing Sheets

(56) References Cited

U.S. PATENT DOCUMENTS

| | | | |
|---|---|---|---|
| 7,756,341 B2 | 7/2010 | Perronnin | |
| 7,899,252 B2 | 3/2011 | Boncyk et al. | |
| 7,962,128 B2 | 6/2011 | Neven et al. | |
| 8,055,103 B2 | 11/2011 | Fu et al. | |
| 8,401,292 B2* | 3/2013 | Park et al. | 382/173 |
| 8,429,168 B1* | 4/2013 | Chechik et al. | 707/741 |
| 8,442,321 B1* | 5/2013 | Chang et al. | 382/181 |
| 8,472,664 B1 | 6/2013 | Jing et al. | |
| 8,478,052 B1* | 7/2013 | Yee et al. | 382/224 |
| 2002/0050094 A1* | 5/2002 | Taulbee | 44/620 |
| 2002/0168117 A1* | 11/2002 | Lee et al. | 382/305 |
| 2002/0184203 A1 | 12/2002 | Nastar et al. | |
| 2004/0002931 A1 | 1/2004 | Platt et al. | |
| 2004/0062435 A1 | 4/2004 | Yamaoka et al. | |
| 2004/0103101 A1 | 5/2004 | Stubler et al. | |
| 2004/0190613 A1 | 9/2004 | Zhu et al. | |
| 2005/0105792 A1 | 5/2005 | Cao et al. | |
| 2005/0259737 A1 | 11/2005 | Chou et al. | |
| 2006/0112042 A1 | 5/2006 | Platt et al. | |
| 2006/0204079 A1 | 9/2006 | Yamaguchi | |
| 2006/0290950 A1* | 12/2006 | Platt et al. | 358/1.2 |
| 2007/0127813 A1* | 6/2007 | Shah | 382/170 |
| 2007/0179921 A1* | 8/2007 | Zitnick et al. | 706/20 |
| 2008/0199044 A1 | 8/2008 | Tsurumi | |
| 2008/0304743 A1* | 12/2008 | Tang et al. | 382/173 |
| 2009/0210413 A1 | 8/2009 | Hayashi et al. | |
| 2009/0232409 A1 | 9/2009 | Marchesootti | |
| 2009/0297032 A1 | 12/2009 | Loui et al. | |
| 2009/0299999 A1* | 12/2009 | Loui et al. | 707/5 |
| 2010/0166339 A1 | 7/2010 | Gokturk et al. | |
| 2010/0169323 A1 | 7/2010 | Liu et al. | |
| 2010/0191722 A1 | 7/2010 | Boiman et al. | |
| 2010/0208983 A1* | 8/2010 | Iwai et al. | 382/159 |
| 2010/0284577 A1 | 11/2010 | Hua et al. | |
| 2011/0040741 A1 | 2/2011 | Korte et al. | |
| 2011/0075927 A1 | 3/2011 | Xu et al. | |
| 2011/0115921 A1* | 5/2011 | Wang et al. | 348/187 |
| 2011/0116711 A1 | 5/2011 | Wang et al. | |
| 2011/0143707 A1 | 6/2011 | Darby, Jr. et al. | |
| 2011/0150320 A1 | 6/2011 | Ramalingam et al. | |
| 2011/0182477 A1* | 7/2011 | Tamrakar et al. | 382/110 |
| 2011/0235923 A1 | 9/2011 | Weisenburger et al. | |
| 2011/0293187 A1 | 12/2011 | Sarkar et al. | |
| 2011/0314049 A1 | 12/2011 | Poirier et al. | |
| 2012/0117069 A1* | 5/2012 | Kawanishi et al. | 707/740 |
| 2012/0158685 A1 | 6/2012 | White et al. | |
| 2012/0158716 A1 | 6/2012 | Zwol et al. | |
| 2012/0170804 A1 | 7/2012 | Lin et al. | |
| 2012/0243789 A1* | 9/2012 | Yang et al. | 382/195 |
| 2012/0269432 A1 | 10/2012 | Wang et al. | |
| 2012/0294477 A1 | 11/2012 | Yang et al. | |
| 2013/0060765 A1 | 3/2013 | Lin | |
| 2013/0060766 A1* | 3/2013 | Lin et al. | 707/723 |
| 2013/0121600 A1 | 5/2013 | Lin | |
| 2013/0132377 A1 | 5/2013 | Lin et al. | |
| 2013/0163874 A1* | 6/2013 | Shechtman et al. | 382/190 |
| 2013/0273968 A1 | 10/2013 | Rhoads et al. | |
| 2014/0003719 A1 | 1/2014 | Bai et al. | |
| 2014/0010407 A1 | 1/2014 | Sinha et al. | |
| 2014/0089326 A1 | 3/2014 | Lin | |

OTHER PUBLICATIONS

Aditya Vailaya, Mario A. T. Figueiredo, Anil K. Jain, and Hong-Jiang Zhang. "Image Classification for Content-Based Indexing" IEEE, 10. Jan. 2001.*

Elif Albuz, Erturk Kocalar, and Ashfaq A. Khokhar. "Scalable Color Image Indexing and Retrieval Using Vector Wavelets" IEEE Transactions on Knowledge and Data Engineering, vol. 13, No. 5, Sep./Oct. 2001.*

"Final Office Action", U.S. Appl. No. 12/869,460, (Dec. 14, 2012), 17 pages.

"Non-Final Office Action", U.S. Appl. No. 12/869,460, (Jun. 18, 2012), 13 pages.

Sivic, J., Zisserman, A., "Video google: A text retrieval approach to object matching in videos," In: ICCV., Proceedings of the Ninth IEEE International Conference on Computer Vision (ICCV 2003) 2-Volume Set, pp. 1-8.

Philbin, J., Chum, O., Isard, M., Sivic, J., Zisserman, A., Object retrieval with large vocabularies and fast spatial matching. In: CVPR. (2007), pp. 1-8.

Z. Wu, Q. Ke, M. Isard, and J. Sun. Bundling features for large scale partial-duplicate web image search. In CVPR, 2009, Microsoft Research, pp. 1-8.

Z. Lin and J. Brandt. A local bag-of-features model for large-scale object retrieval. In ECCV, 2010, Springer-Verlag Berlin Heidelberg, pp. 294-308.

Y. Cao, C. Wang, Z. Li, L. Zhang, and L. Zhang. Spatial-bag-of-features. IEEE, In CVPR, 2010, pp. 1-8.

O. Chum and J. Matas. Unsupervised discovery of co-occurrence in sparse high dimensional data. In CVPR, 2010, pp. 1-8.

O. Chum, A. Mikulik, M. Perd'och, and J. Matas. Total recall II: Query expansion revisited. In CVPR, 2011, pp. 889-896.

O. Chum, M. Perd'och, and J. Matas. Geometric min-hashing: Finding a (thick) needle in a haystack. IEEE, In CVPR, 2009, pp. 17-24.

O. Chum, J. Philbin, J. Sivic, M. Isard, and A. Zisserman. Total recall: Automatic query expansion with a generative feature model for object retrieval. In ICCV, 2007, pp. 1-8.

H. Jegou, M. Douze, and C. Schmid. Hamming embedding and weak geometric consistency for large scale image search. In ECCV, 2008, Author manuscript, published in "10th European Conference on Computer Vision (ECCV '08) 5302 (2008) 304-317".

H. Jegou, M. Douze, and C. Schmid. On the burstiness of visual elements. In CVPR, 2009, Author manuscript, published in "IEEE Conference on Computer Vision and Pattern Recognition (CVPR '09) (2009) 1169-1176".

H. Jegou, M. Douze, C. Schmid, and P. Perez. Aggregating local descriptors into a compact image representation. In CVPR, Author manuscript, published in 23rd IEEE Conference on Computer Vision & Pattern Recognition (CVPR '10) (2010) 3304-3311.

H. Jegou, H. Harzallah, and C. Schmid. A contextual dissimilarity measure for accurate and efficient image search. In CVPR, 2007, Author manuscript, published in Conference on Computer Vision & Pattern Recognition (CVPR '07) (2007) pp. 1-8.

H. Jegou, C. Schmid, H. Harzallah, and J. Verbeek. Accurate image search using the contextual dissimilarity measure. Author manuscript, published in IEEE Transactions on Pattern Analysis and Machine Intelligence 32, 1 (2010) 2-11.

C. H. Lampert. Detecting objects in large image collections and videos by efficient subimage retrieval. In ICCV, 2009, pp. 1-8.

D. G. Lowe. Distinctive image features from scale-invariant keypoints. IJCV, 60(2):91-110, Received Jan. 10, 2003; Revised Jan. 7, 2004; Accepted Jan. 22, 2004, 2004, pp. 1-20.

A. Mikulik, M. Perd'och, O. Chum, and J. Matas. Learning a fine vocabulary. In ECCV, 2010, pp. 1-14.

M. Muja and D. G. Lowe. Fast approximate nearest neighbors with automatic algorithm configuration. In VISAPP, 2009, pp. 1-10.

D. Nister and H. Stewenius. Scalable recognition with a vocabulary tree. In CVPR, 2006, pp. 1-8.

M. Perd'och, O. Chum, and J. Matas. Efficient representation of local geometry for large scale object retrieval. In CVPR, 2009, pp. 1-8.

J. Philbin, O. Chum, M. Isard, J. Sivic, and A. Zisserman. Lost in quantization: Improving particular object retrieval in large scale image databases. In CVPR, 2008, pp. 1-8.

J. Philbin, M. Isard, J. Sivic, and A. Zisserman. Descriptor learning for efficient retrieval. In ECCV, 2010, pp. 1-14.

D. Qin, S. Gammeter, L. Bossard, T. Quack, and L. VanGool. Hello neighbor: accurate object retrieval with k-reciprocal nearest neighbors. In CVPR, 2011, pp. 1-8.

J. Yuan, Y. Wu, and M. Yang. Discovery of collocation patterns: from visual words to visual phrases. IEEE, in CVPR, 2007, pp. 1-8.

Y. Zhang, Z. Jia, and T. Chen. Image retrieval with geometry-preserving visual phrases. In CVPR, 2011, pp. 809-816.

U.S. Appl. No. 12/869,460, filed Aug. 26, 2010, Zhe Lin, et al.

U.S. Appl. No. 13/552,595, filed Jul. 18, 2012, Zhe Lin, et al.

U.S. Appl. No. 13/552,596, filed Jul. 18, 2012, Zhe Lin, et al.

(56) References Cited

OTHER PUBLICATIONS

Leibe, B., Leonardis, A., Schiele, B.: Combined object categorization and segmentation with an implicit shape model. In: ECCV Workshop on Statistical Learning in Computer Vision. (2004), pp. 1-16.
Google Mobile, "Coogle Goggles," downloaded from http://www.google.com/mobile/goggles/#text on Sep. 28, 2012, (c)2011 Google, 1 page.
Amazon, "A9.com Innovations in Search Technologies—Flow," downloaded from http://flow.a9.com on Sep. 28, 2012, (c) 2003-2011 A9.com, Inc. 1 page.
Xiaohui Shen, et al., "Object retrieval and localization with spatially-constrained similarity measure and k-NN re-ranking," Jun. 16-21, 2012, 2012 IEEE Conference on Computer Vision and Pattern Recognition (CVPR), pp. 1-8.
Tom Yeh, et al., "Fast concurrent object localization and recognition," In: CVPR. 2009 IEEE, pp. 280-287.
He, J., Lin, T.H., Feng, J., Chang, S.F., "Mobile product search with bag of hash bits,". In: ACM MM. (2011), pp. 1-8.
Griffin, G., Holub, A., Perona, P., "Caltech-256 object category dataset," Technical Report 7694, California Institute of Technology (2007), pp. 1-20.
Wang, X., Yang, M., Cour, T., Zhu, S., Yu, K., Han, T.X.: Contextual weighting for vocabulary tree based image retrieval. In: ICCV. (2011), pp. 1-8.
Jing, Y., Baluja, S.: Pagerank for product image search. In: WWW 2008 / Refereed Track: Rich Media (2008), pp. 1-9.
Lin, X., Gokturk, B., Sumengen, B., Vu, D.: Visual search engine for product images. In: Multimedia Content Access: Algorithms and Systems II. 2008 SPIE Digital Library, pp. 1-9.
Girod, B., Chandrasekhar, V., Chen, D., Cheung, N.M., Grzeszczuk, R., Reznik, Y., Takacs, G., Tsai, S., Vedantham, R.: Mobile visual search. IEEE Signal Processing Magazine 28 (2011), pp. 1-11.
Chandrasekhar, V., Chen, D., Tsai, S., Cheung, N.M., Chen, H., Takacs, G., Reznik, Y., Vedantham, R., Grzeszczuk, R., Bach, J., Girod, B.: The stanford mobile visual search dataset. In: ACM Multimedia Systems Conference. (2011), pp. 1-6.
Rother, C., Kolmogorov, V., Blake, A.: Grabcut: Interactive foreground extraction using iterated graph cuts. In: SIGGRAPH. (2004), pp. 1-6.
Batra, D., Kowdle, A., Parikh, D., Luo, J., Chen, T.: icoseg: Interactive cosegmentation with intelligent scribble guidance. In: CVPR. (2010), pp. 1-8.
Rother, C., Kolmogorov, V., Minka, T., Blake, A.: Cosegmentation of image pairs by histogram matchingincorporating a global constraint into mrfs. In: CVPR. (2006), pp. 1-8.
Bourdev, L.D., Malik, J.: Poselets: Body part detectors trained using 3d human pose annotations. In: ICCV. (2009), pp. 1-8.
Brox, T., Bourdev, L.D., Maji, S., Malik, J.: Object segmentation by alignment of poselet activations to image contours. In: CVPR. (2011), pp. 2225-2232.
Wu, B., Nevatia, R.: Simultaneous object detection and segmentation by boosting local shape feature based classifier. In: CVPR. (2007), pp. 1-8.
Opelt, A., Zisserman, A.: A boundary fragment model for object detection. In: ECCV. (2006), pp. 1-14.
U.S. Appl. No. 13/434,028, filed Mar. 29, 2012, Zhe Lin, et al.
U.S. Appl. No. 13/624,615, filed Sep. 21, 2012, Zhe Lin, et al.
"Non-Final Office Action", U.S. Appl. No. 13/552,595, (Jul. 30, 2013),13 pages.
"Non-Final Office Action", U.S. Appl. No. 13/552,596, (Aug. 6, 2013),11 pages.
"Final Office Action", U.S. Appl. No. 13/552,596, Dec. 26, 2013, 14 pages.
"Final Office Action", U.S. Appl. No. 13/552,595, Nov. 12, 2013, 15 pages.
"Non-Final Office Action", U.S. Appl. No. 12/869,460, Sep. 24, 2013, 18 pages.
"Final Office Action", U.S. Appl. No. 12/869,460, Dec. 31, 2013, 20 pages.
"Non-Final Office Action", U.S. Appl. No. 13/434,028, Oct. 1, 2013, 22 pages.
Fulkerson, et al., "Localizing Objects with Smart Dictionaries", Proceedings of the 10th European Conference on Computer Vision: Part I, Oct. 2008, pp. 179-192.
Grauman, "Indexing with local features, Bag of words models", UT-Austin. Retrieved from <http://www.cs.utexas.edu/~grauman/courses/fall2009/slides/lecture16_bow.pdf>, Oct. 29, 2009, 39 pages.
Jegou, et al., "Improving bag-of-features for large scale image search", International Journal of Computer Vision, vol. 87 Issue 3, Mar. 15, 2011, 21 pages.
Lazebnik, et al., "Beyond Bags of Features: Spatial Pyramid Matching for Recognizing Natural Scene Categories", CVPR, Jun. 2006, 8 pages.
Vailaya, et al., "Image Classification for Content-Based Indexing", IEEE Transactions on Image Processing, vol. 10 Issue 1, Jan. 2001, pp. 117-130.
"Non-Final Office Action", U.S. Appl. No. 13/624,615, Feb. 6, 2014, 15 pages.
"Notice of Allowance", U.S. Appl. No. 13/434,028, Mar. 28, 2014, 7 pages.

\* cited by examiner

Characterize each image of a set of images with a set of fixed-orientation texture descriptors and a set of color descriptors
560

Index the set of images in a color index including the set of color descriptors for the each image of the set of images and a texture index including the set of fixed-orientation texture descriptors for the each image of the set of images
562

FIG. 5E

Characterize each image of a set of images with a set of sparse feature descriptors and a set of dense feature descriptors, such that both the set of sparse feature descriptors and the set of dense feature descriptors are calculated based on a fixed rotation
570

Index the set of images in a feature index including the set of sparse feature descriptors for the each image of the set of images, and the set of dense feature descriptors for the each image of the set of images
572

FIG. 5G

METHODS AND APPARATUS FOR VISUAL SEARCH

CLAIM OF PRIORITY TO PROVISIONAL APPLICATION

This application claims benefit of priority of U.S. Provisional Application Ser. No. 61/535,975 entitled "Methods and Apparatus for Visual Search" filed Sep. 17, 2011, the content of which is incorporated by reference herein in its entirety.

BACKGROUND

Description of the Related Art

Visual search or content-based image search/retrieval is a long-studied problem in computer vision and multimedia content analysis. In visual object search, given a large number of images stored on a computer or on a server, attempts are made to efficiently organize those images based on their contents using a computational method.

Conventional bag-of-features (BoF) algorithms are well-established in image and video retrieval applications. These algorithms typically receive a query image and then attempt to find similar images within a database of images.

A conventional BoF algorithm first extracts feature descriptors from each image. For example, a suitable feature descriptor may be a Scale-Invariant Feature Transform (SIFT) descriptor or the like. A clustering process then uniquely maps each feature descriptor to a cluster center or "visual word." After the clustering operation, each image is represented by a histogram that indicates the number of occurrences of each visual word in the whole image. The algorithm then produces a list indicating which database images more closely match the query image. The list may be ranked according to a metric calculated based on a comparison between histograms of the query and database images.

SUMMARY

For each image of a set of images, the each image is characterized with a set of fixed-orientation texture descriptors and a set of color descriptors. The set of images is indexed in a color index and a texture index. Similarly, a query image is characterized with a set of fixed-orientation texture descriptors. The set of fixed orientation texture descriptors of the query image includes a set of fixed orientation descriptors for each of a set of rotated query images, and a set of color descriptors of the query image. A rotated local Bag-of-Features (BoF) operation is performed upon the set of rotated query images and the set of images. Each of the set of images is ranked based on the rotated local Bag-of-Features operation.

BRIEF DESCRIPTION OF THE DRAWINGS

FIG. 5E is a high-level logical flowchart of indexing operations that can be used in visual search using color and texture analysis, according to some embodiments.

FIG. 5G is a high-level logical flowchart of indexing operations that can be used in visual search based on sparse and dense features, according to some embodiments.

Figure 1:
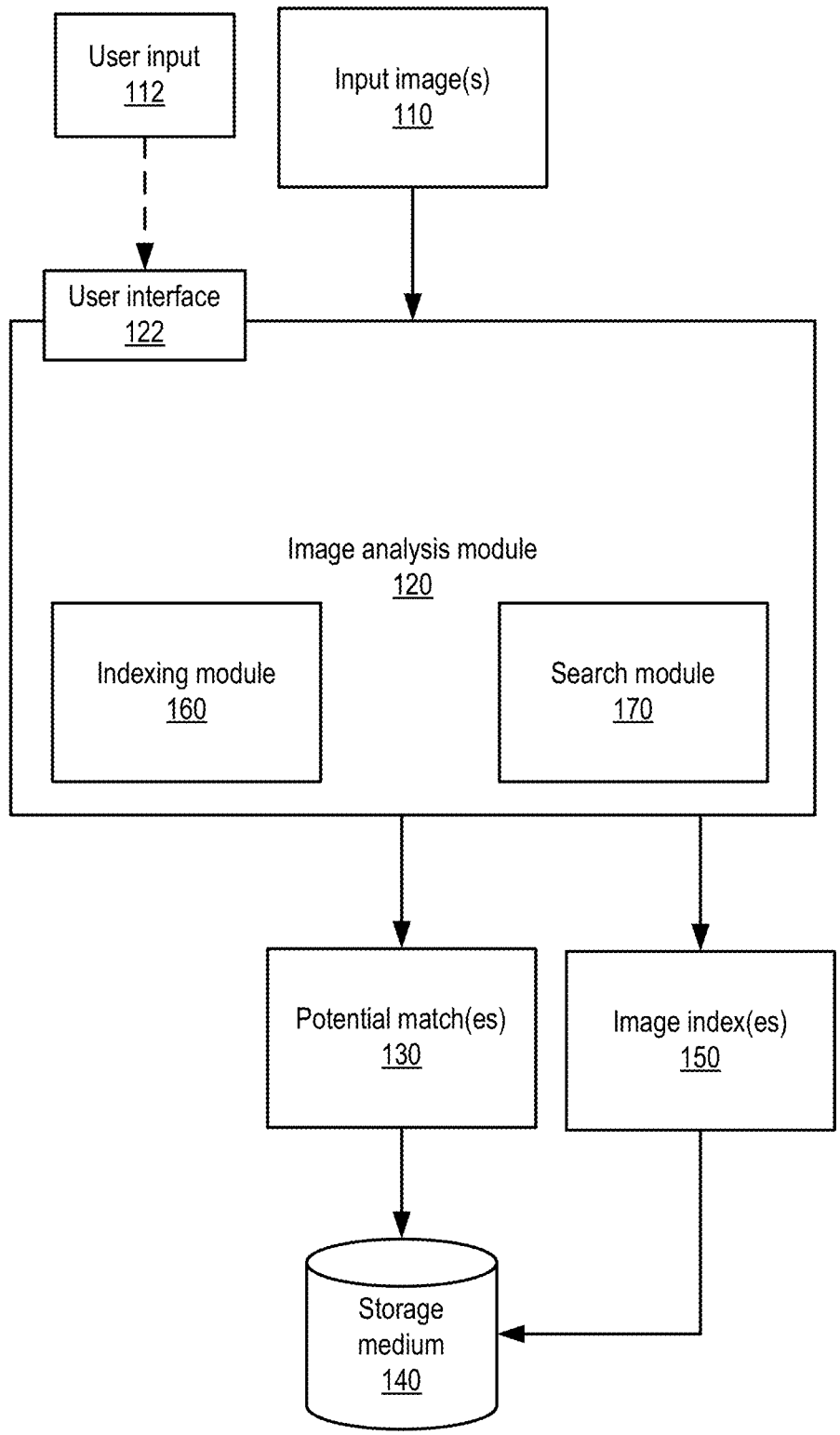
FIG. 1 illustrates an image analysis module that may implement visual search, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art.

An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for image indexing and search are disclosed. Some embodiments combine multiple visual cues in a unified bag-of-words image retrieval framework to search images or objects from large collections. Some embodiments use one or more of color and texture descriptors. Some embodiments use one or more of sparse and dense feature descriptors. Some embodiments encode spatial information in feature descriptors. Further, some embodiments used fixed orientation for some or all descriptors. Some embodiments leverage a "local bag-of-features framework" to support scalable sub-image retrieval, which is disclosed in U.S. patent application Ser. No. 12/869,460 entitled "Systems and Methods for Localized Bag-of-Features Retrieval", the content of which is incorporated herein by reference for all purposes as though reproduced herein in its entirety. Additionally, some embodiments support iterative refinement based on user selection of results.

Some embodiments may include a means for indexing a set of images and for searching the set of images using a rotated local bag of features operation. For example, an indexing module may receive a set of images and may prepare inverted index files describing each image of the set of images in terms of descriptors, as described herein. As an additional example, a search module may characterize a query image as a set of feature descriptors, as described herein, which may include preparing a rotated set of query images and preparing descriptors from each of the rotated set of query images. In some embodiments, the descriptors are calculated based on color and texture at a fixed rotation for the individual descriptor. In some embodiments, the descriptors are based on sparse feature identification and dense feature identification. The search module may perform a rotated local bag of features operation with respect to the query image or rotated query images and may rank the images of the set of images based on the rotated local bag of features operation. The search module may further provide for iterative refinement of results via presentation of results to a user and user selection of preferred results. The search module and the indexing module, or one of the two modules, may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform one or more operations of the search module or the indexing module, or both, as described herein. Other embodiments of the search module and the indexing module, or both, may be at least partially implemented by hardware circuitry and/or firmware stored, for example, in a non-volatile memory.

Image Search Techniques

Some embodiments extract both sparse and dense local interest regions from query images and from a set of images to be compared to the query image. Sparse interest regions are salient local regions that are detected by so-called Difference-of-Gaussian (DoG) filters. In some embodiments, the DoG filters react strongly on blob-like structures. In some embodiments, the sparse feature detector is replaced with other salient region detectors such as multi-scale Harris-corner detector or Harris-Affine region detector.

In some embodiments, dense interest regions are uniformly sampled regions from image regions of a particular image, and across multiple scales, while sparse features have better invariance properties but can generate "featureless phenomenon" in textureless regions. Similarly, dense features have slightly worse invariance properties but can complement sparse features by covering information on featureless regions. In some embodiments, the two types of features are complementary in terms of information coverage, such that embodiments employing their combination yield a more comprehensive image representation.

Some embodiments represent images using both local color and texture descriptors. As used herein, a local color descriptor means a local color histogram computed from an interest region. Hence, given N local interest regions, some embodiments obtain N color descriptors. Local texture descriptors are extracted using an extended version of SIFT (scale invariant feature transform) developed by Lowe in 2004. Some embodiments fix the dominant orientation of each patch (also referred to as "gravity constraints" in the literature), such that the semi-local image structures are matched consistently between images. In some embodiments, SIFT descriptors encode image appearance by local gradient orientation histograms. SIFT descriptors are frequently invariant to many image variations, such as scaling and translation, as well as frequently being robust to illumination and viewpoint changes.

In some embodiments, combined sparse/dense local features along with fixed orientation will sufficiently capture the spatial appearance structure of an image, and also can be adapted to retrieval methods handling variations (e.g., translation and scaling).

In some embodiments, which employ what is referred to as rotated bag-of-features operation or rotated local bag-of-features operation, combined sparse/dense features with fixed orientation can be adapted to resolve issues created by image rotations in the following way. (1) Given a query image, some embodiments run retrieval several times over a set of rotated versions of the original query: $Q_\theta$ for a discrete set of rotation angles. (2) Some embodiments use "max pooling" to choose the best rotation angle $\theta^*$ for each database image D, i.e. choose the rotation angle which maximizes the similarity S between Q and D: $\theta^0 = \arg\max_\theta S(Q_\theta, D)$, where $S(Q,D) = S(Q_\theta, D)$. In some embodiments, the similarity $S(Q_\theta, D)$ is computed as a linear combination of color and texture similarity: $S(Q_\theta, D) = \alpha S_{texture}(Q_\theta, D) + (1-\alpha) S_{color}(Q_\theta, D)$, where $\alpha$ is the weight between texture and color cues, and $S_{texture}$ and $S_{color}$ are computed based on a local bag-of-features retrieval method.

Some embodiments incorporate spatial constraints in the global bag-of-features retrieval process through a voting mechanism by adding spatial information in the inverted files. Some embodiments incorporate the spatial constraints in this voting framework by storing feature location and scale as additional information and using the feature location and scale information in the search algorithm. Specifically, some embodiments weight each feature vote by a probability of spatial consistency P; the probability is computed by $P = \exp(-\beta \times f_d^2)$, where $f_d$ is defined as the distance, (i.e. sum of squared differences of the scale and relative 2D location between a query feature point and a database image feature point corresponding to the same visual word), and $\beta$ is a parameter to penalize the spatial inconsistency between the two features. Note that, in case there are multiple query features corresponding to the same visual word, some embodiments choose only the best matching feature (with the largest P) for each database feature corresponding to that visual word. The probability is summed to serve as the effective number of features corresponding to that visual word. The same process is also performed in the reverse direction by computing the effective number of query features for that visual word by accumulating the probabilities. Such embodiments are designed to ensure that only features that have spatial consistency will be voted for with respect to the similarity, and consequently reduce the effect of corruption of the similarity score by the visual burstiness.

The feature geometric information that some embodiments incorporate into the search algorithm provides strong and flexible spatial cues during feature matching. In some embodiments providing local search with a user-provided rectangle, such embodiments also apply the above scheme of incorporating spatial information in an image re-ranking process after the initial global bag-of-features matching. Given rectangle estimates, such embodiments re-compute the similarity between the query sub-image and the database sub-image by the same voting-based method, and incorporate the spatial information by matching the relative spatial coordinates $(x^r, y^r)$ with respect to the estimated rectangle rather than with respect to the entire image frame.

In order to support the above calculation, some embodiments store the feature information (v,x,y,s) effectively into the inverted file structure by attaching spatial information (x,y,s) to the visual word v.

Some embodiments also use a relevance feedback-based approach to refine search results effectively upon initial search using a "recursive refinement method." This is done by recursively adding 'true' images identified by the user into the retrieval process. The refinement works by running the search query for each image of the query image set, and choosing the maximum similarity of each database image to the query set. The refined search result is returned by re-ranking the images with the decreasing order of the maximum similarity. This arrangement is referred to as a "max-pooling"-based refinement process. More formally, given a current set of query ($Q_1, Q_2, \ldots Q_k$), the maximum similarity scores ($S_1, S_2, \ldots S_N$), and a set of currently added new queries ($Q_{k+1}, \ldots Q_m$), some embodiments rank the database image ($D_1, D_2, \ldots D_N$) by the following procedure:

(1) run search using the set of new queries, and compute $S(Q_i, D_j)$ for all $\theta \in \{k+1, \ldots m\}$ and $/\epsilon \{1, 2 \ldots N\}$
(2) compute the new similarity as: $S_j^{new} = \max(S_j, \max_{i \in (k+1, \ldots m)}(S(Q_i, D_j)))$
(3) compute the refined ranking by sorting $D_j$ based on $S_j^{new}$ Such a search refinement algorithm is, in some embodiments, able to retain the maximum similarity, and incrementally compute the maximum similarity for any updates provided by current user interaction to avoid any redundant computation. Due to this incremental and recursive nature of the algorithm, some embodiments of the refinement process are very efficient.

Some embodiments have been demonstrated with a set of 1000 images as an evaluation database. In one demonstration, the evaluation database consists of 250 objects with each having 4 images. The database was collected to cover a variety of appearance variations between instances of the same object, i.e. under scale, rotation and viewpoint changes, different instances of the same category, similar scenes, etc. Embodiments include a standalone application of searching images locally on a computer using wxWidgets. Embodiments may also provide a feature, which for example is called "visual search," in a larger image processing software package and has three sub features: visual similarity search, object search, and duplicate detection.

Example Implementations

FIG. 1 illustrates an image analysis module that may implement one or more of the indexing and search techniques and tools illustrated in FIGS. 5A through 9C. Image analysis module 120 may, for example, implement one or more of an object search tool, a similarity search tool, or a duplicate detection tool. FIG. 10 illustrates an example computer system on which embodiments of image analysis module 120 may be implemented. Image analysis module 120 receives as input digital images 110. In some embodiments, input images include a set of images for indexing and a query image for search. Example input images are shown in FIGS. 8A-9C. Image analysis module 120 may receive user input 112 activating an object search tool, a similarity search tool, or a duplicate detection tool.

Image analysis module 120 then queries indexed input image(s) 110 using a query input image, according to user input 112 received via user interface 122, such as to assign weights to various image characteristics in the query, using the object search tool, the similarity search tool, or the duplicate detection tool. The user may select results for search refinement and iterate a query using the object search tool or the similarity search tool. Image analysis module 120 generates as output one or more image indexes 150 and one or more potential matches 130. Image indexes 150 and potential matches 130 may, for example, be stored to a storage medium 140, such as system memory, a disk drive, DVD, CD, etc.

In some embodiments, image analysis module 120 may provide a user interface 122 via which a user may interact with the image analysis module 120, for example to activate the object search tool, the similarity search tool, or the duplicate detection tool, to set parameters such as the weights of various image characteristics on query results, or to perform a selection gesture for indicating that an image is to be used in search refinement. In some embodiments, the user interface may provide user interface elements whereby the user may select options including, but not limited to, the search criteria for use, weights, sets of images to be searched or types of searches to be performed.

Figure 2:
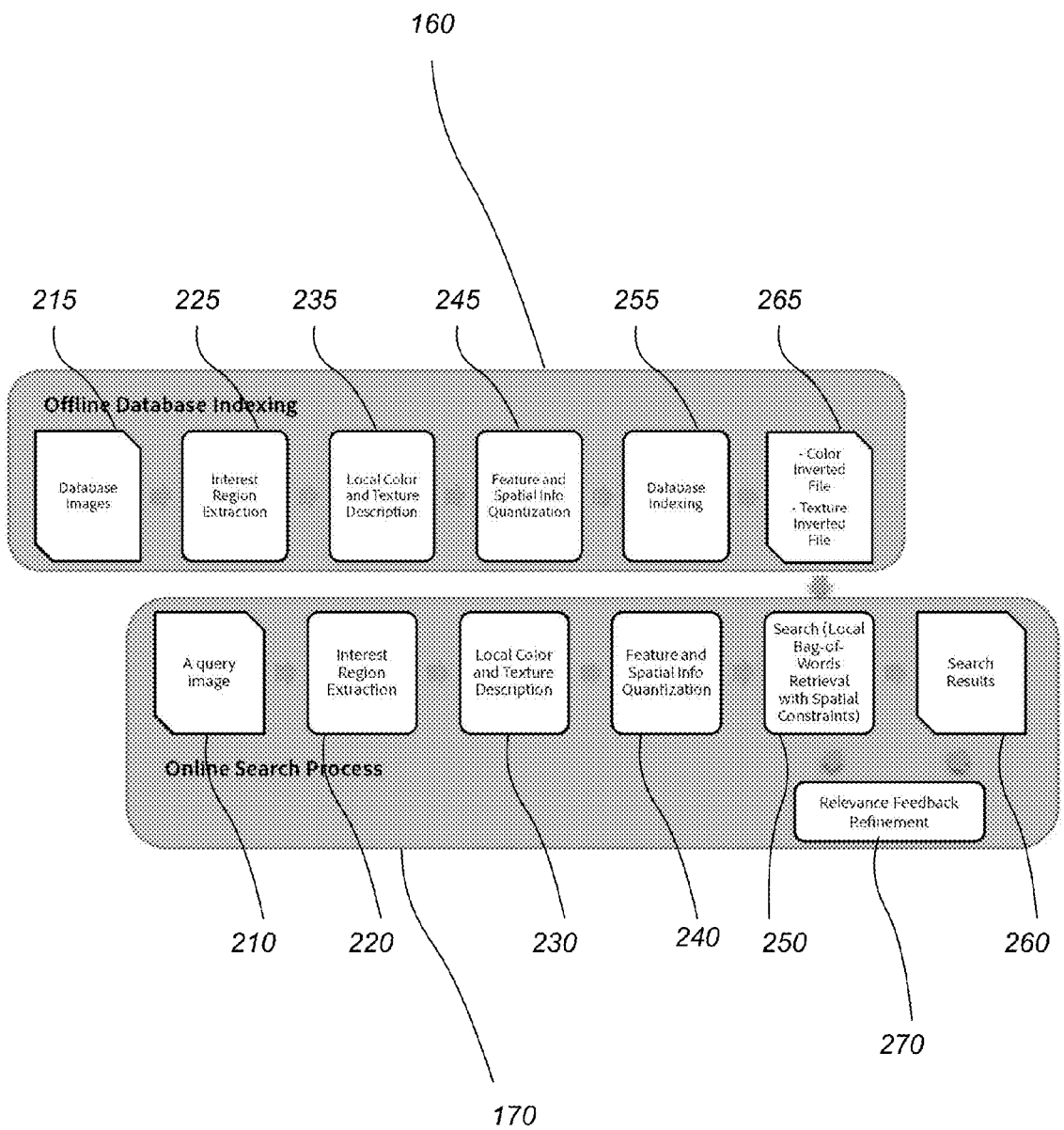
FIG. 2 depicts an indexing module and a search module that may implement visual search, according to some embodiments.

FIG. 2 depicts an indexing module and a search module that may implement visual search, according to some embodiments. Indexing module 160 illustrates components that may be used for indexing a set of images. Search module 170 depicts components that may be used for an online process for search and user-based refinement. In some embodiments, during database indexing, multiple types of local descriptors for each of dataset images 215 are divided into interest regions through a process of interest region extraction 225, independently quantized into visual words (a representative set of local descriptors) through a process of local color and texture description 235, and the spatial information is also packed and quantized into an integer via uniform range quantization through a process of feature and spatial quantization 245. The quantized descriptors and spatial information are organized into a structure called an inverted index (a table of image IDs organized by visual word) through a process of database indexing 255 for efficient search. The inverted index is built independently for color and texture cues as, for example, a color inverted file and a texture inverted file 265. Some embodiments employ indexes based on both color and texture at a fixed rotation, while other embodiments employ indexes based on color or texture. Some embodiments combine sparse and dense features, while other embodiments rely on either sparse or dense features. Further, in some embodiments, texture descriptors at a fixed rotation are used for sparse and dense features.

During search with respect to a query image 210, query image 210 is divided into interest regions through a process of interest region extraction 220. Multiple types of local descriptors are independently quantized into visual words (a representative set of local descriptors) through a process of local color and texture description 230, and the spatial information is also packed and quantized into an integer via uniform range quantization through a process of feature and spatial quantization 240. Sparse bag-of-features matching is formulated as a voting process, and the spatial constraints are incorporated in each feature-to-feature vote between the query image and each of the database images in a Search (Local Bag-of-Words Retrieval with Spatial Constraints) 250 to generate search results 260, which could be later updated using relevance feedback refinement 270 by users.

Figure 3:
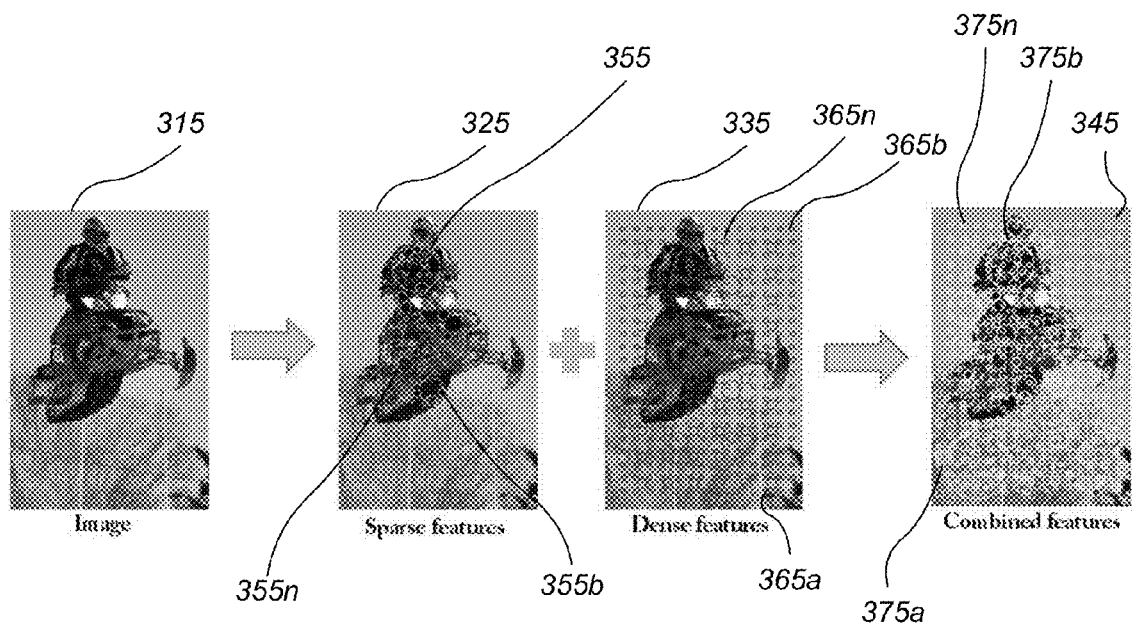
FIG. 3 illustrates results of sparse, dense, and combined sparse and dense feature extraction that may be used to implement visual search, according to some embodiments.

FIG. 3 illustrates results of sparse, dense, and combined sparse and dense feature extraction that may be used to implement visual search, according to some embodiments. A native image 315 is subjected to extraction of sparse features (circles 355a-355n) in image 325) and extraction of dense features (circles 365a-365n in image 335). A combined feature set (circles 375a-375n in image 345) illustrates one embodiment of a sparse-and-dense feature detection result.

Figure 4:
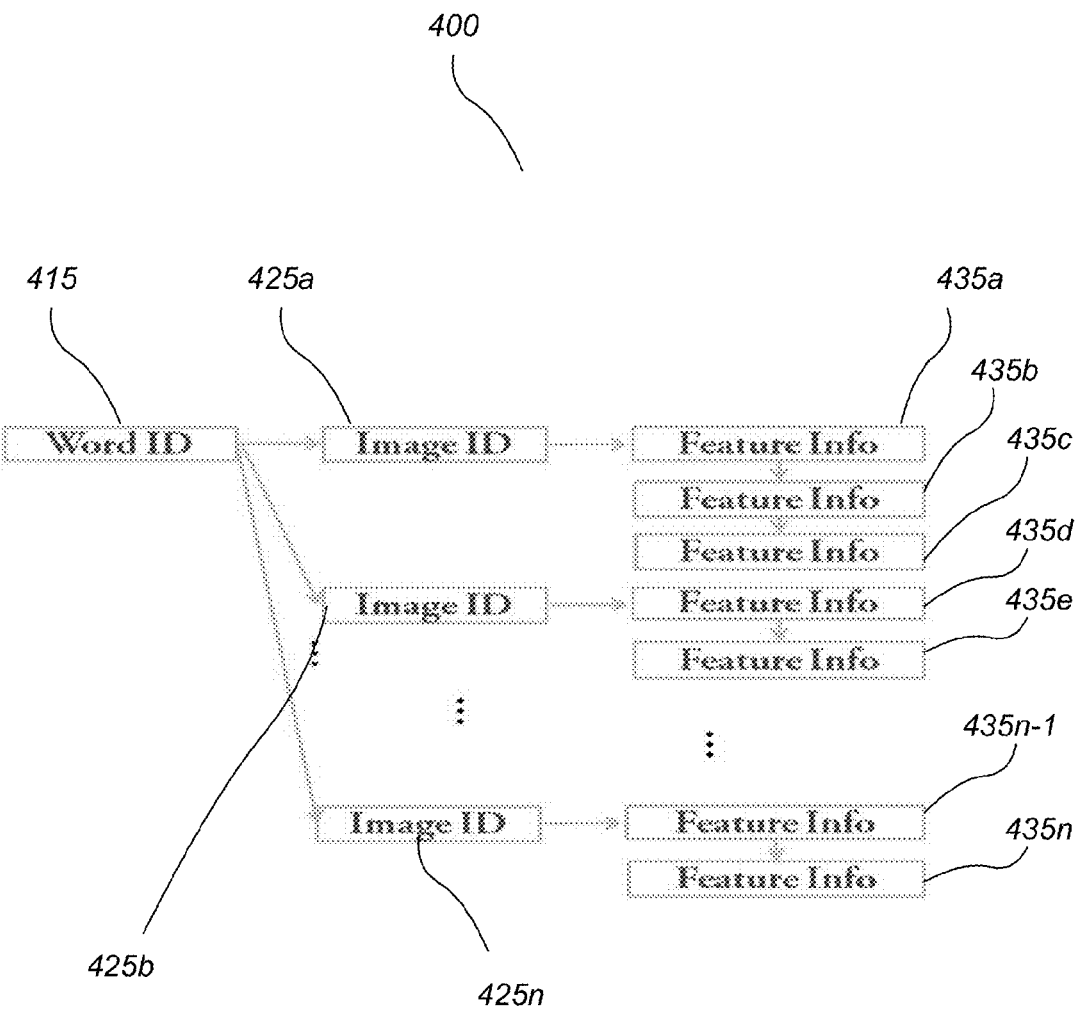
FIG. 4 depicts an inverted file that may be used to implement visual search, according to some embodiments.

FIG. 4 depicts an inverted file that may be used to implement visual search, according to some embodiments. In one embodiment, the structure of an inverted file 400 (index) for color or texture is shown. Feature information is encoded in a single "byte" storage which includes both local feature location and scale. A word ID 415 is associated with a set of ImageIDs 425a-425n, which are in turn associated with sets of feature information 435a-435n.

Figure 5A:
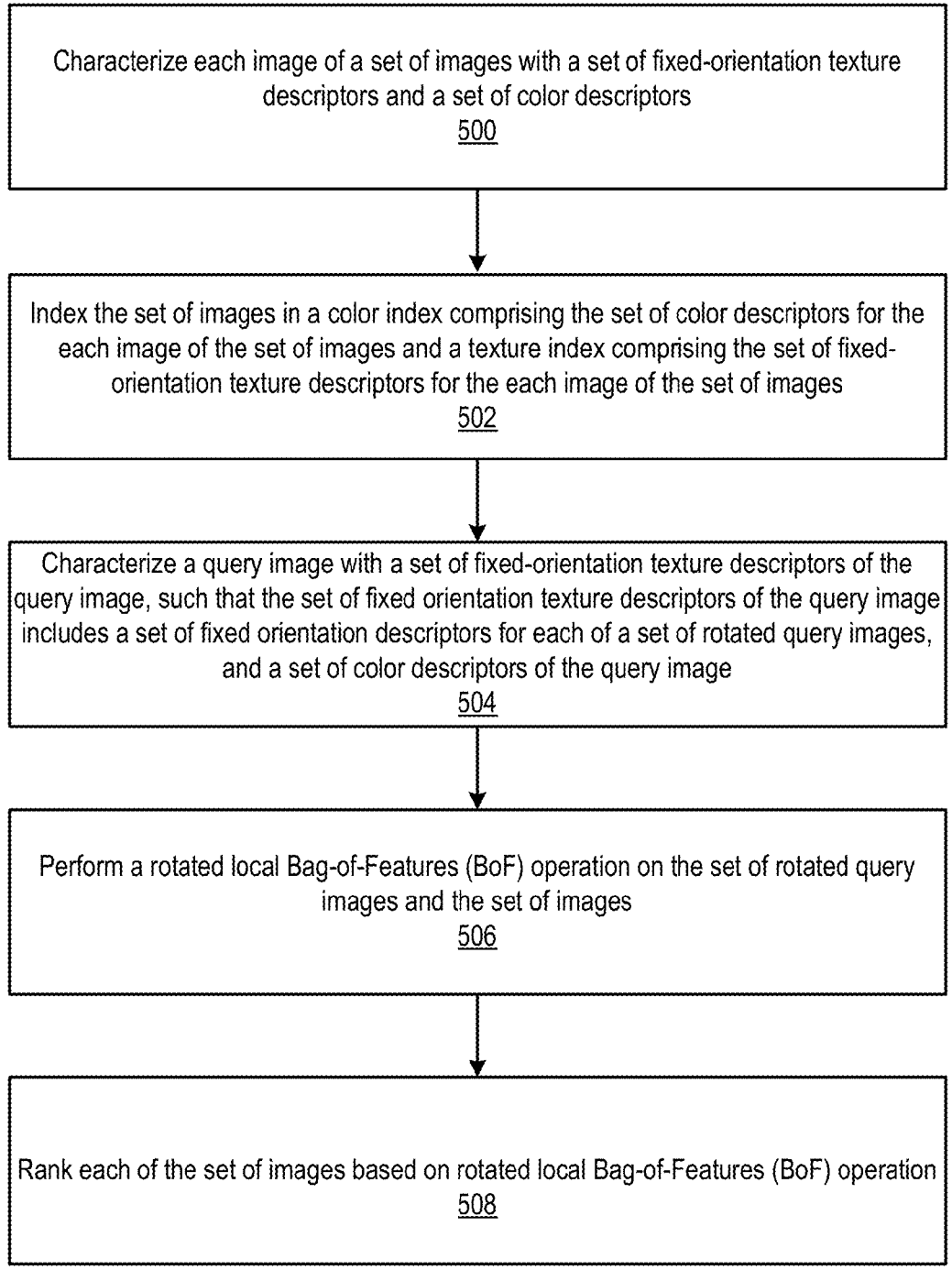
FIG. 5A is a high-level logical flowchart of indexing and search operations that can be used in visual search with color and texture analysis, according to some embodiments.

FIG. 5A is a high-level logical flowchart of indexing and search operations that can be used in visual search with color and texture analysis, according to some embodiments. Each image of a set of images is characterized with a set of fixed-orientation texture descriptors and a set of color descriptors (block 500). The set of images is indexed in a color index comprising the set of color descriptors for the each image of the set of images and a texture index comprising the set of fixed-orientation texture descriptors for the each image of the set of images (block 502). Similarly, a query image is characterized with a set of fixed-orientation texture descriptors and color descriptors of the query image. The query includes a set of fixed orientation texture descriptors for each of a set of rotated query images, and a set of color descriptors of the query image (block 504). A rotated local Bag-of-Features (BoF) operation is performed on the set of rotated query images against the set of database images (block 506). Each of the set of images is ranked based on rotated local Bag-of-Features (BoF) operation (block 508).

In some embodiments, performing the rotated local BoF operation includes scoring, for each of the set of database images, one or more regions that have similarity to at least one of the rotated query images. In some embodiments, the scoring includes taking a maximum of a set of similarity scores for a set of rotated query images with respect to the each of the set of images.

In some embodiments, for the each image of the set of images, the set of fixed orientation texture descriptors and the set of color descriptors characterize a set of dense features and a set of sparse features. In some embodiments, the indexing comprises encoding spatial information in the set of color descriptors and the set of fixed-orientation texture descriptors. In some embodiments, the spatial information comprises scale and location information, and the scoring comprises determining differences between the position of a feature of the query image and a position of a corresponding feature in each of the set of images. In some embodiments, performing the rotated local BoF operation includes scoring, for each of the set of database images, one or more regions that have similarity to at least one of the rotated query images based on a user-weighted combination of color and texture.

Figure 5B:
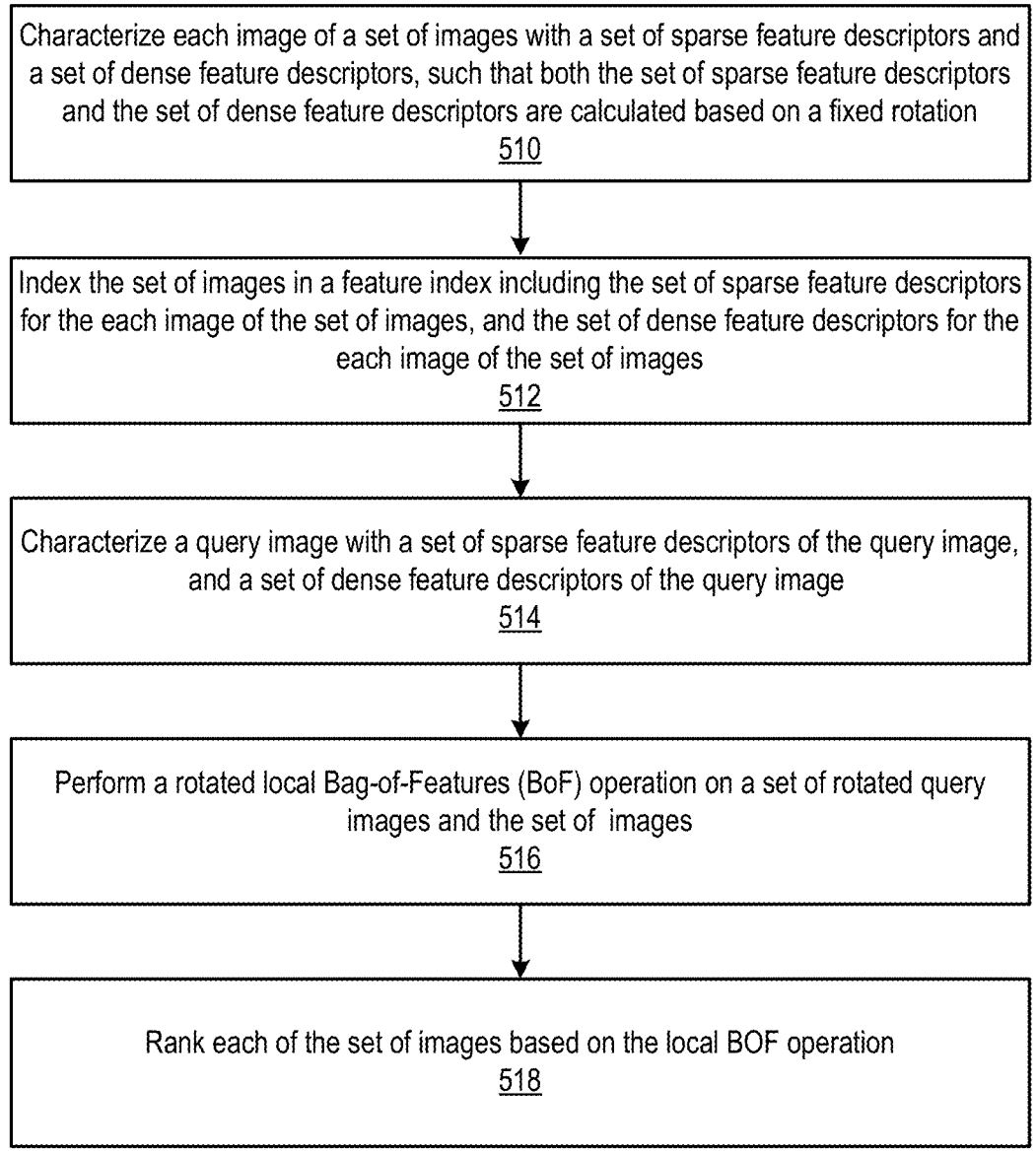
FIG. 5B is a high-level logical flowchart of indexing and search operations that can be used in visual search with sparse and dense feature analysis, according to some embodiments.

FIG. 5B is a high-level logical flowchart of indexing and search operations that can be used in visual search with sparse and dense feature analysis, according to some embodiments. Each image of a set of images is characterized with a set of sparse feature descriptors and a set of dense feature descriptors, such that both the set of sparse feature descriptors and the set of dense feature descriptors are calculated based on a fixed rotation (block 510). The set of images is indexed in a feature index including the set of sparse feature descriptors for the each image of the set of images, and the set of dense feature descriptors for the each image of the set of images (block 512). A query image is characterized with a set of sparse feature descriptors of the query image, and a set of dense feature descriptors of the query image (block 514). A rotated local Bag-of-Features (BoF) operation is performed on a set of rotated query images and the set of images (block 516). Each of the set of images is ranked based on the local BOF operation (block 518).

Figure 5C:
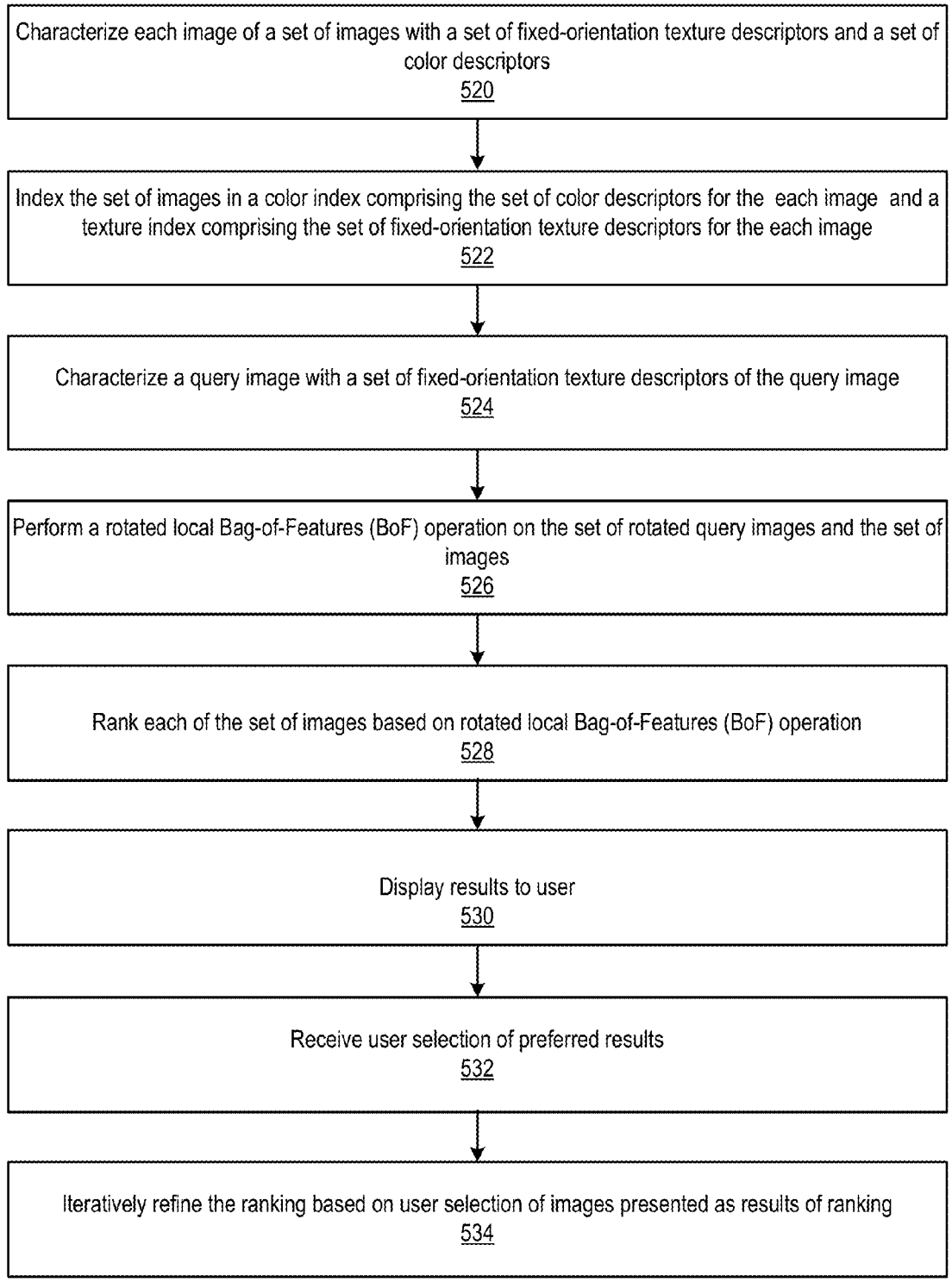
FIG. 5C is a high-level logical flowchart of indexing and search operations that can be used in visual search with color and texture analysis and with iteration based on result selection, according to some embodiments.

FIG. 5C is a high-level logical flowchart of indexing and search operations that can be used in visual search with color and texture analysis and with iteration based on result selection, according to some embodiments. Each image of a set of images is characterized with a set of fixed-orientation texture descriptors and a set of color descriptors (block 520). The set of images is indexed in a color index comprising the set of color descriptors for the each image and a texture index comprising the set of fixed-orientation texture descriptors for the each image (block 522). A query image is characterized with a set of fixed-orientation texture descriptors of the query image (block 524). A rotated local Bag-of-Features (BoF)

operation is performed on the set of rotated query images and the set of images (block 526). Each of the set of images is ranked based on results of the rotated local bag of features operation (block 528). Results are displayed to the user (block 530). User selection of preferred results is received (block 532). The ranking is iteratively refined based on user selection of images presented as results of ranking (block 534).

Figure 5D:
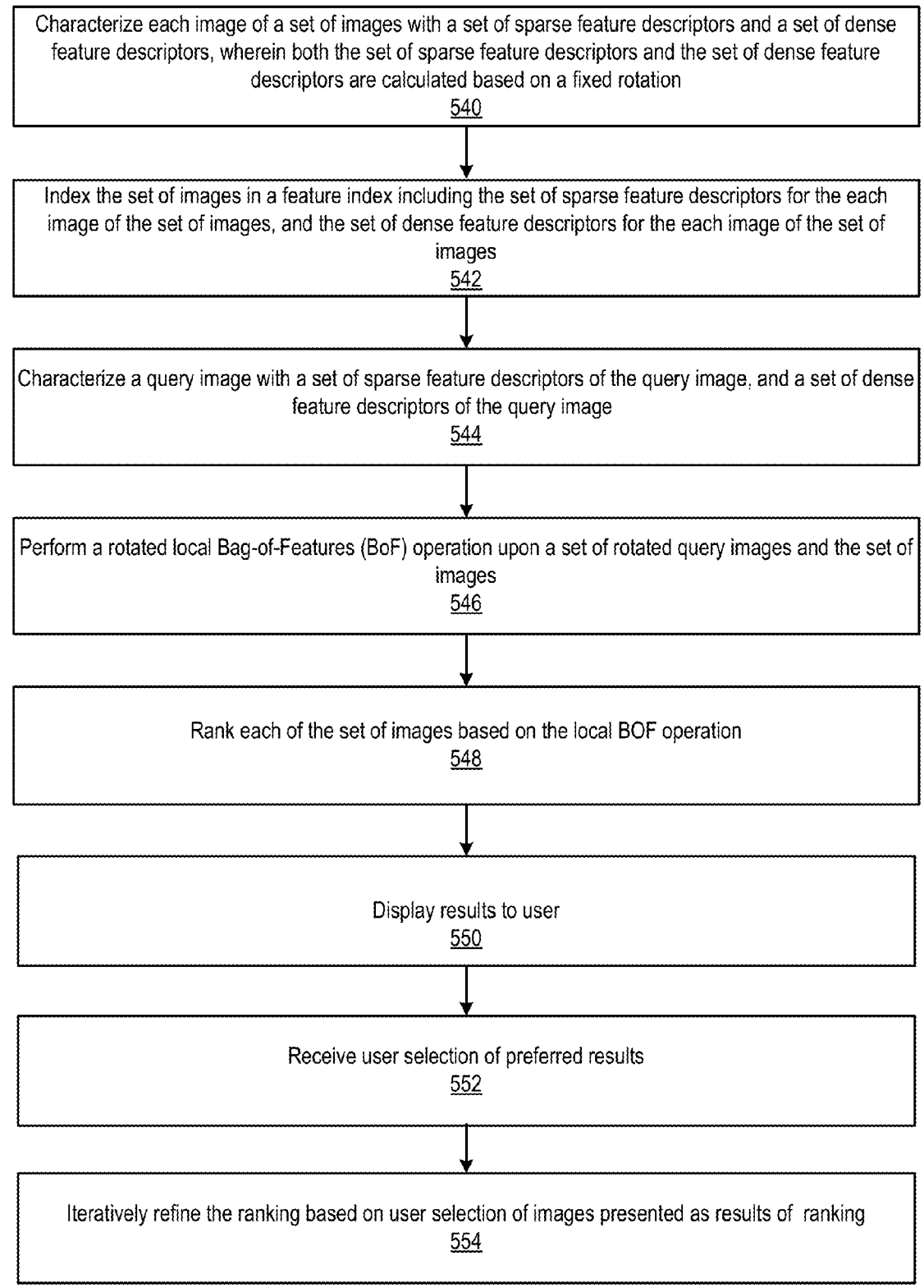
FIG. 5D is a high-level logical flowchart of indexing and search operations that can be used in visual search based on sparse and dense features with iteration based on result selection, according to some embodiments.

FIG. 5D is a high-level logical flowchart of indexing and search operations that can be used in visual search based on sparse and dense features with iteration based on result selection, according to some embodiments. Each image of a set of images is characterized with a set of sparse feature descriptors and a set of dense feature descriptors, wherein both the set of sparse feature descriptors and the set of dense feature descriptors are calculated based on a fixed rotation (block 540). The set of images is indexed in a feature index including the set of sparse feature descriptors for the each image of the set of images, and the set of dense feature descriptors for the each image of the set of images (block 542). A query image is characterized with a set of sparse feature descriptors of the query image, and a set of dense feature descriptors of the query image (block 544). A rotated local Bag-of-Features (BoF) operation is performed on a set of rotated query images and the set of images (block 546). Each of the set of images is ranked based on the rotated local BOF operation (block 548). Results are displayed to a user (block 550). User selection of preferred results is received (block 552). The ranking is iteratively refined based on user selection of images presented as results of the ranking (block 554).

FIG. 5E is a high-level logical flowchart of indexing operations that can be used in visual search using color and texture analysis, according to some embodiments. Each image of a set of images is characterized with a set of fixed-orientation texture descriptors and a set of color descriptors (block 560). The set of images is indexed in a color index including the set of color descriptors for the each image of the set of images and a texture index including the set of fixed-orientation texture descriptors for the each image of the set of images (block 562).

Figure 5F:
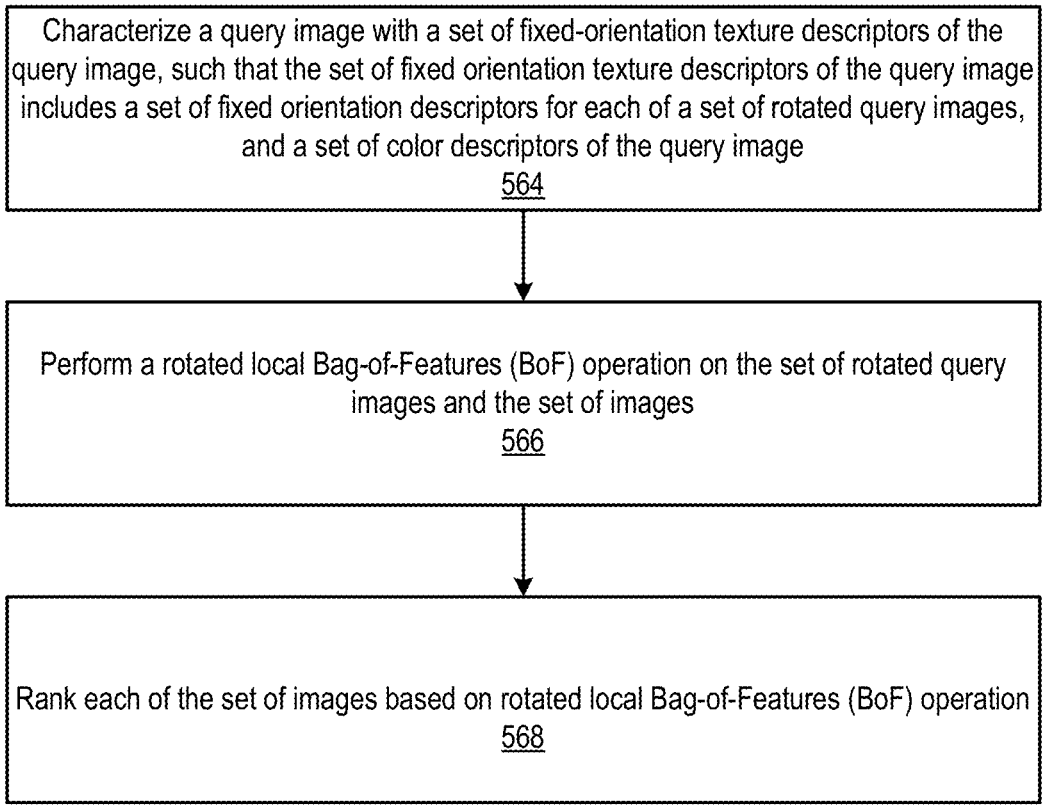
FIG. 5F is a high-level logical flowchart of search operations that can be used in visual search using color and texture analysis, according to some embodiments.

FIG. 5F is a high-level logical flowchart of search operations that can be used in visual search using color and texture analysis, according to some embodiments. A query image is characterized with a set of fixed-orientation texture descriptors of the query image, such that the query image includes a set of fixed orientation descriptors for each of a set of rotated query images, and a set of color descriptors of the query image (block 564). A rotated local Bag-of-Features (BoF) operation is performed on the set of rotated query images and the set of images (block 566). Each of the set of images is ranked based on rotated local Bag-of-Features (BoF) operation (block 568).

FIG. 5G is a high-level logical flowchart of indexing operations that can be used in visual search based on sparse and dense features, according to some embodiments. Each image of a set of images is characterized with a set of sparse feature descriptors and a set of dense feature descriptors, such that both the set of sparse feature descriptors and the set of dense feature descriptors are calculated based on a fixed rotation (block 570). The set of images is indexed in a feature index including the set of sparse feature descriptors for the each image of the set of images, and the set of dense feature descriptors for the each image of the set of images (block 572).

Figure 5H:
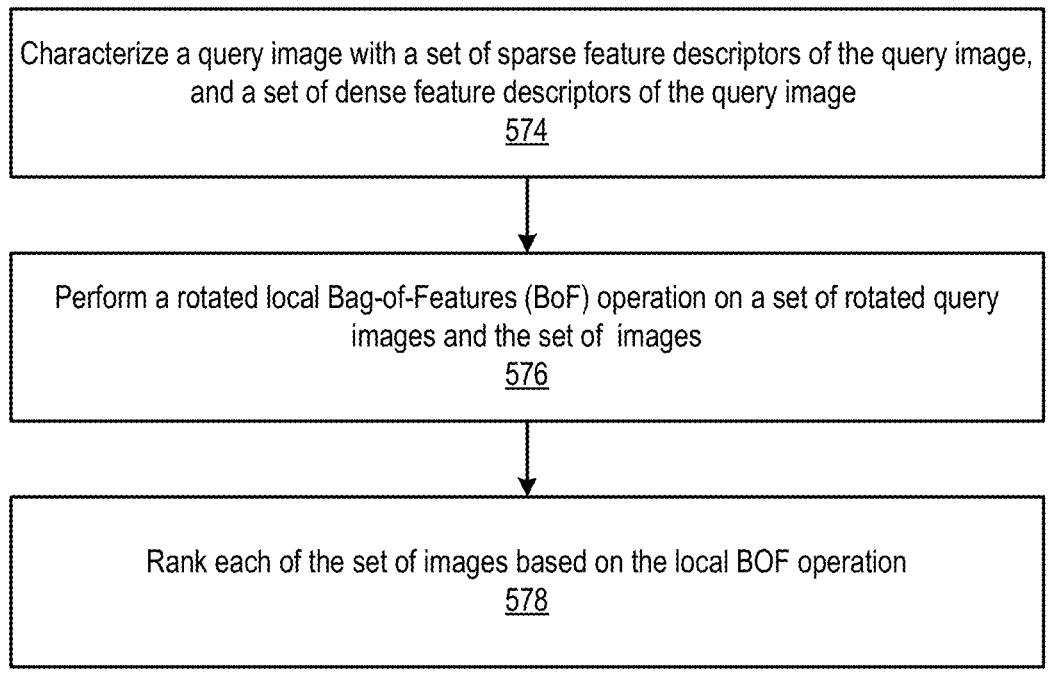
FIG. 5H is a high-level logical flowchart of search operations that can be used in visual search based on sparse and dense features, according to some embodiments.

FIG. 5H is a high-level logical flowchart of search operations that can be used in visual search based on sparse and dense features, according to some embodiments. A query image is characterized with a set of sparse feature descriptors of the query image, and a set of dense feature descriptors of the query image (block 574). A rotated local Bag-of-Features (BoF) operation is performed on a set of rotated query images and the set of images (block 576). Each of the set of images is ranked based on the rotated local BOF operation (block 578).

Figure 6A:
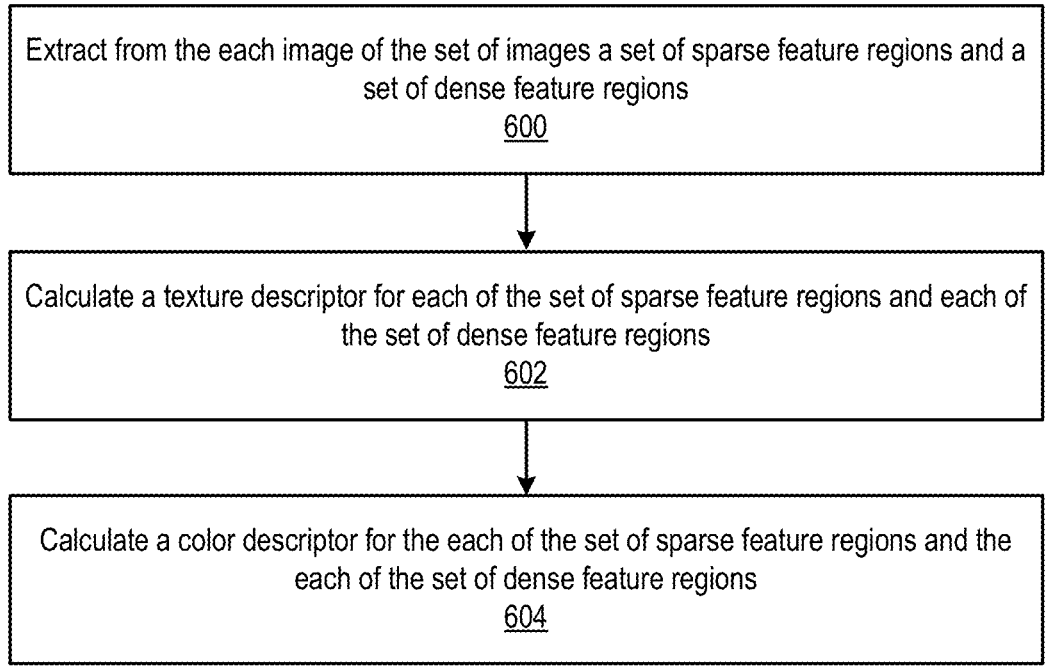
FIG. 6A is a high-level logical flowchart of image characterization operations that can be used with a set of images for indexing for visual search, according to some embodiments.

FIG. 6A is a high-level logical flowchart of image characterization operations that can be used with a set of images for indexing for visual search, according to some embodiments. A set of sparse feature regions and a set of dense feature regions is extracted from each image of a set of images (block 600). A texture descriptor is calculated for each of the set of sparse feature regions and each of the set of dense feature regions (block 602). A color descriptor is calculated for the each of the set of sparse feature regions and the each of the set of dense feature regions (block 604).

Figure 6B:
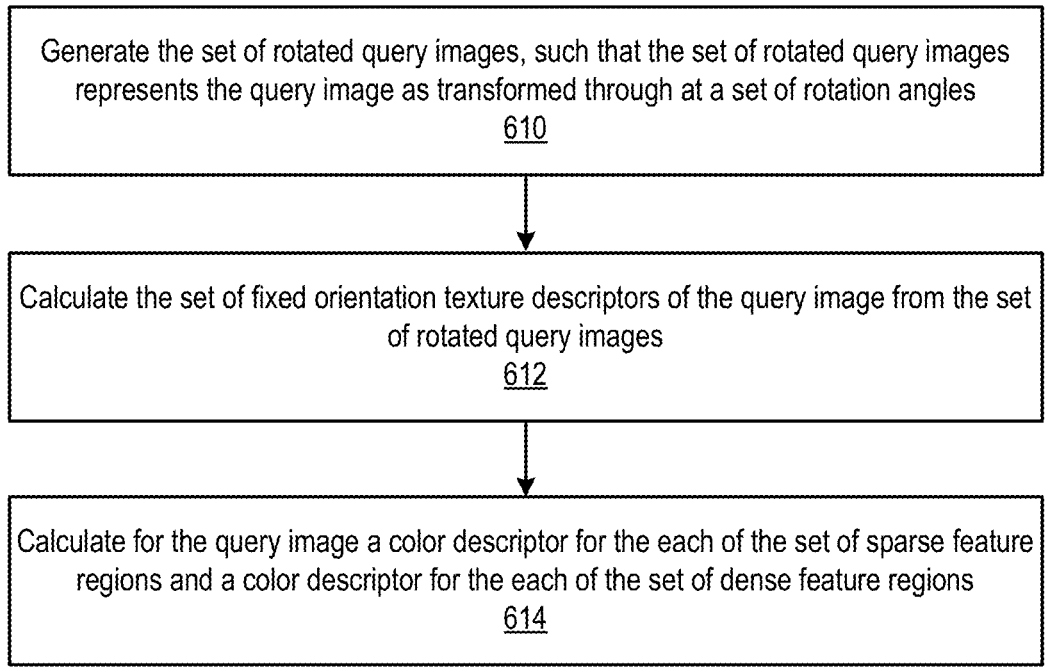
FIG. 6B is a high-level logical flowchart of image characterization operations that can be used on a query operation for search operations for visual search, according to some embodiments.

FIG. 6B is a high-level logical flowchart of image characterization operations that can be used on a query operation for search operations visual search, according to some embodiments. A set of rotated query images is generated, such that the set of rotated query images represents the query image as transformed through at a set of rotation angles (block 610). A set of fixed orientation texture descriptors of the query image from the set of rotated query images (block 612). A color descriptor for each of the set of sparse feature regions and a color descriptor for the each of the set of dense feature regions is calculated for the query image (block 614).

In some embodiments, the operations further include extracting from the query image a set of sparse feature regions of fixed orientation and a set of dense feature regions of fixed orientation. Likewise, in some embodiments, the calculating the set of fixed orientation texture descriptors of the query image further comprises calculating for the each of set of rotated query images a set of texture descriptors for the each of the set of sparse feature regions and a set of texture descriptors for the each of the set of dense feature regions.

Figure 7A:
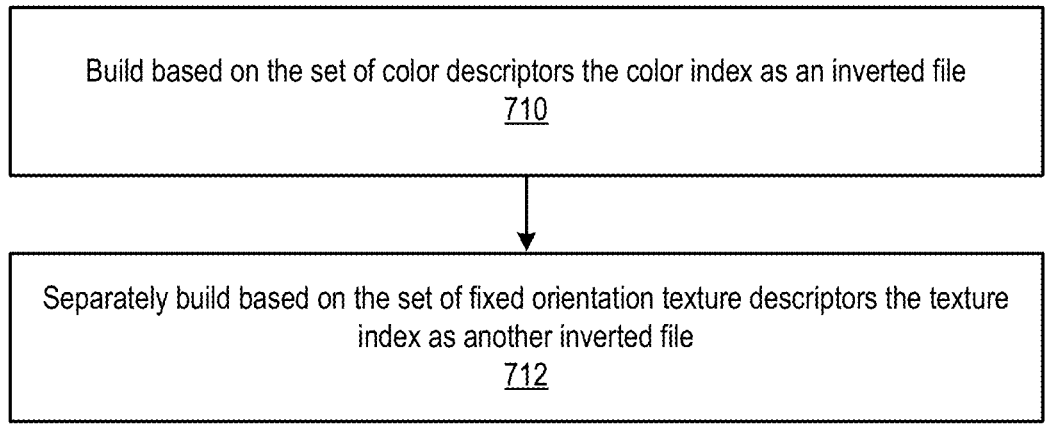
FIG. 7A is a high-level logical flowchart of image indexing operations that can be used with a set of images for indexing for visual search, according to some embodiments.

FIG. 7A is a high-level logical flowchart of image indexing operations that can be used with a set of images for indexing for visual search, according to some embodiments. Based on a set of color descriptors a color index is built as an inverted file (block 710). Based on a set of fixed orientation texture descriptors, a texture index is separately built as another inverted file (block 712).

Figure 8A:
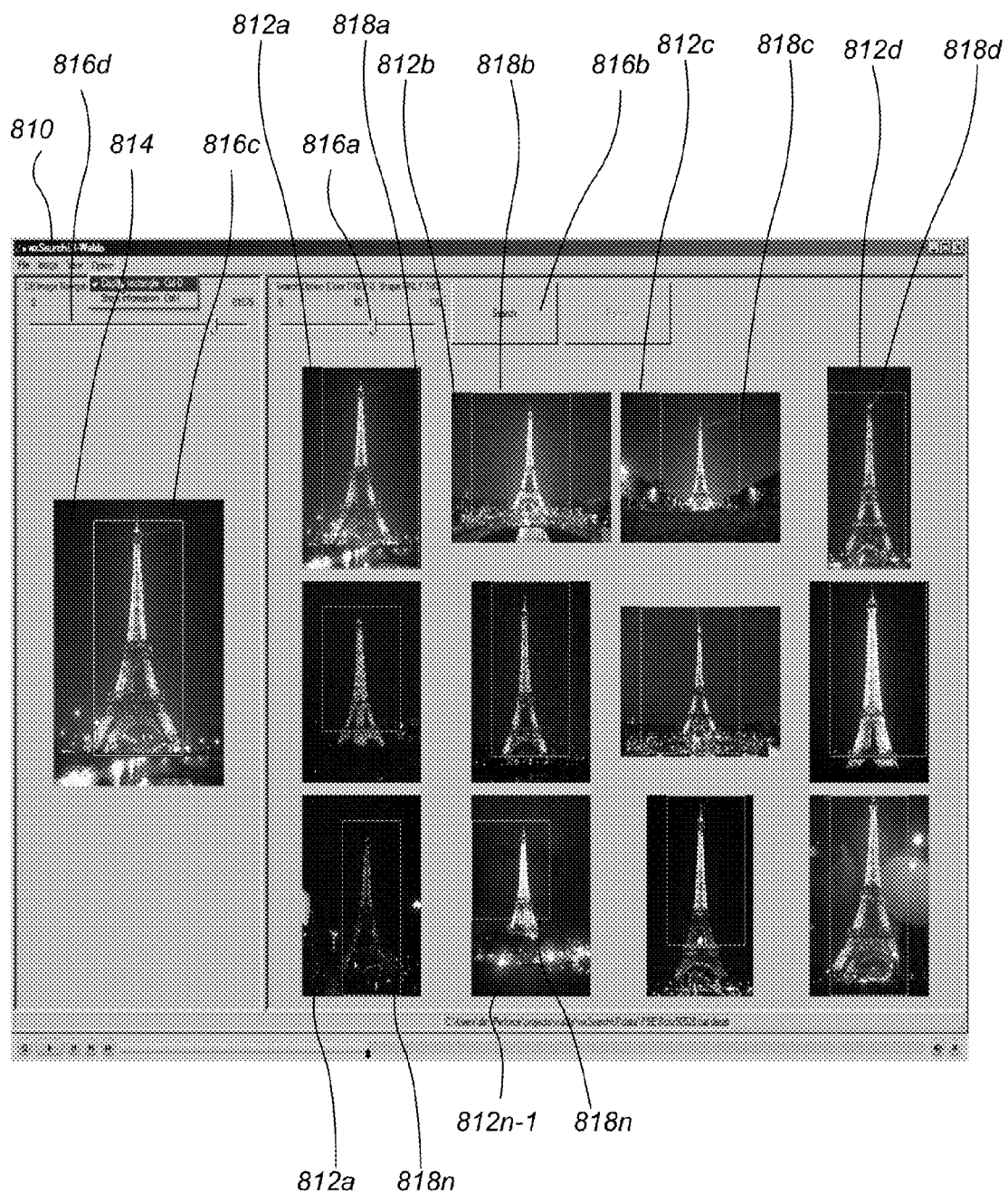
FIG. 8A is a user interface for an object search application of visual search, according to some embodiments.

FIG. 8A is a user interface for an object search application of visual search, according to some embodiments. A user interface 810 provides access to a standalone application of for visual search in wxWidgets for object search. The figure illustrates an example of object search in a collection of 61575 images, and a navigation control 816*d* is indicated. A selection box 816*c* is provided to allow a user to indicate a portion of a query image 814 on which to base a search. A weighting control 816*a* is provided for a user to indicate the degree to which matches are to be selected based on color or texture. A search button 816*b* is provided to allow a user to commence a search after adjustments to either weighting control 816*a*, selection of a new query image 814, or selection box 816*c*. Results 812*a*-812*n* are displayed along with selection boxes 818*a*-818*n* indicating an image portion matching the image portion of selection box 816*c*.

Figure 8B:
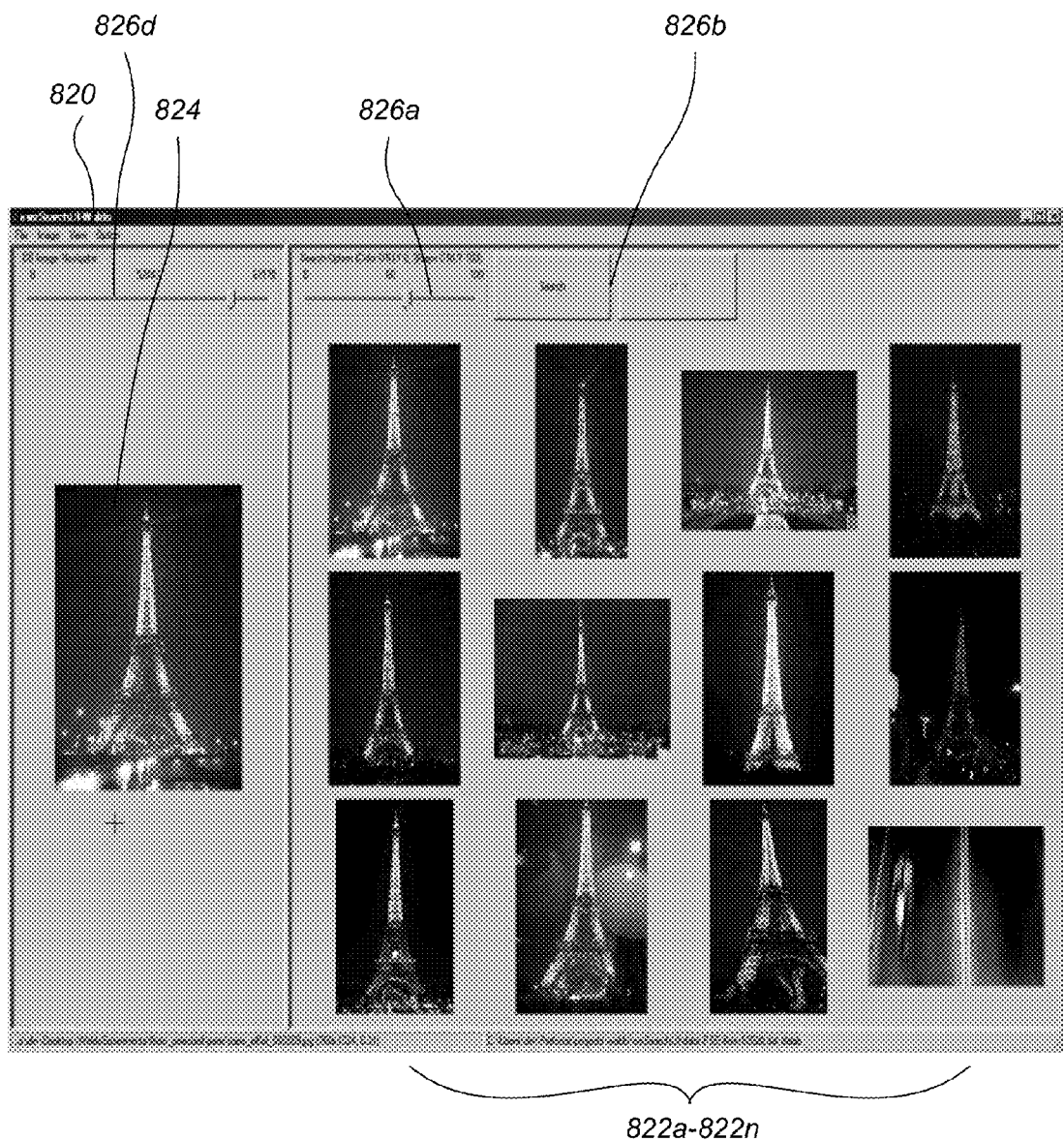
FIG. 8B is a user interface for a similarity search application of visual search, according to some embodiments.

FIG. 8B is a user interface for a similarity search application of visual search, according to some embodiments. A user interface 820 provides access to a standalone application for visual search in wxWidgets for similarity search. A query image 824 on which to base a search is displayed. A weighting control 826*a* is provided for a user to indicate the degree to which matches are to be selected based on color or texture. A search button 826*b* is provided to allow a user to commence a search after adjustments to either weighting control 826a or selection of a new query image 824. Results 822a-822n are displayed.

Example System

Figure 9:
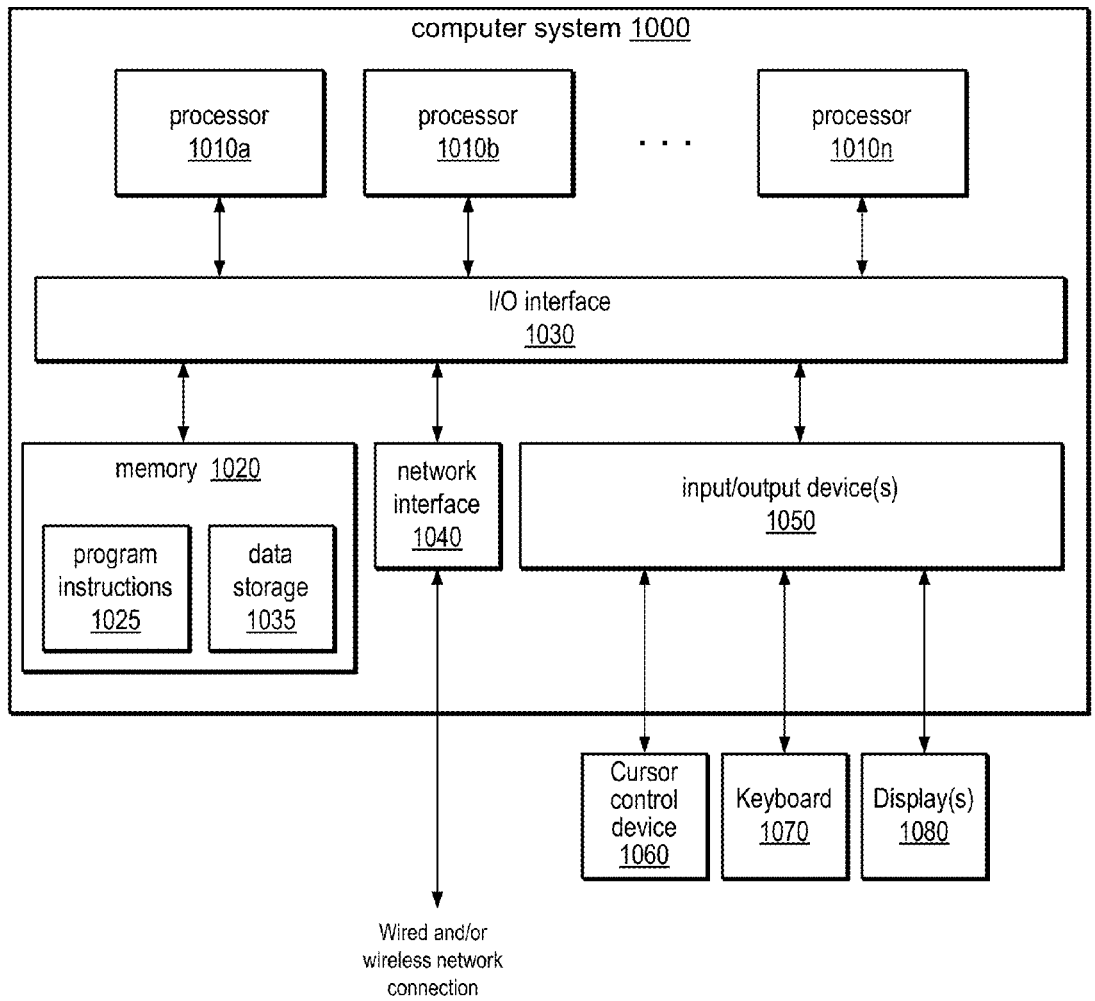
FIG. 9 illustrates an example computer system that may be used in embodiments.

Embodiments of an image analysis module or the various indexing and search tools described herein may be executed on one or more computer systems, which may interact with various other devices. One such computer system is illustrated by FIG. 9.

In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an image analysis module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement embodiments of an image analysis module as described herein, and data storage 1035, comprising various data accessible by program instructions 1025. In one embodiment, program instructions 1025 may include software elements of embodiments of an image analysis module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of an image analysis module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    executing an image analysis module on one or more processors of a computing device to perform:
        characterizing each image in a set of images with a set of fixed-orientation texture descriptors and a set of color descriptors;
        indexing the set of images in a color index comprising the set of color descriptors for each image of the set of images, and in a texture index comprising the set of fixed-orientation texture descriptors for each image of the set of images, the indexing comprising encoding spatial information in the set of color descriptors and in the set of fixed-orientation texture descriptors, the spatial information including feature location and scale as encoded in both the set of color descriptors and in the set of fixed-orientation texture descriptors;
        characterizing a query image with the set of fixed-orientation texture descriptors of the query image, the set of fixed-orientation texture descriptors of the query image comprising a set of fixed orientation descriptors for each of a set of rotated query images, and with the set of color descriptors of the query image;
        performing a rotated local Bag-of-Features (BoF) operation upon the set of rotated query images and the set of images; and
        ranking each of the set of images based on the rotated local Bag-of-Features operation.

2. The method of claim 1, wherein the characterizing each image further comprises:
    extracting from each image of the set of images a set of sparse feature regions and a set of dense feature regions;
    calculating a texture descriptor for each of the set of sparse feature regions and each of the set of dense feature regions; and
    calculating a color descriptor for each of the set of sparse feature regions and each of the set of dense feature regions.

3. The method of claim 1, wherein the indexing the set of images comprises:
    building based on the set of color descriptors the color index as an inverted file; and
    separately building based on the set of fixed orientation texture descriptors the texture index as another inverted file.

4. The method of claim 1, wherein the characterizing the query image comprises:
    generating the set of rotated query images that represents the query image as transformed through at a set of rotation angles;

calculating the set of fixed orientation texture descriptors of the query image from the set of rotated query images; and calculating for the query image a color descriptor.

5. The method of claim 4, further comprising:

extracting from the query image a set of sparse feature regions of fixed orientation and a set of dense feature regions of fixed orientation; and wherein the calculating the set of fixed orientation texture descriptors of the query image further comprises calculating for each transformed query image of the set of rotated query images:

a set of texture descriptors for the each of the set of sparse feature regions; and a set of texture descriptors for the each of the set of dense feature regions.

6. The method of claim 1, wherein performing the rotated local BoF operation comprises scoring, for each of the images in the set of images, one or more regions that have similarity to at least one of the rotated query images.

7. The method of claim 6, wherein the scoring comprises taking a maximum of a set of similarity scores for the set of rotated query images with respect to the each of the set of images.

8. The method of claim 6, wherein the scoring further comprises scoring based on a probability of spatial correspondence between features based on scale and translation.

9. A system, comprising:

at least one processor; and a memory comprising program instructions that are executable by the at least one processor as an image analysis module configured to:

characterize each image in a set of images with a set of fixed-orientation texture descriptors, and a set of color descriptors;

index the set of images in a color index comprising the set of color descriptors for each image of the set of images and in a texture index comprising the set of fixed-orientation texture descriptors for each image of the set of images, the indexing comprising encoding spatial information in the set of color descriptors and in the set of fixed-orientation texture descriptors, the spatial information including feature location and scale as encoded in both the set of color descriptors and in the set of fixed-orientation texture descriptors;

characterize a query image with the set of fixed-orientation texture descriptors of the query image, the set of fixed orientation texture descriptors of the query image comprising a set of fixed orientation descriptors for each of a set of rotated query images, and with the set of color descriptors of the query image;

perform a rotated local Bag-of-Features (BoF) operation upon the set of rotated query images and the set of images; and rank each of the set of images based on the rotated local Bag-of-Features operation to generate an image ranking 10. The system of claim 9, further comprising instructions are executable by the at least one processor to: wherein the image analysis module is configured to iteratively refine said ranking based on user selection of images presented as results of said ranking 11. The system of claim 9, wherein for each of the images, the texture index comprises the set of fixed-orientation texture descriptors and the set of color descriptors that characterize a set of dense features and a set of sparse features.

12. The system of claim 9, wherein to index the set of images, the image analysis module is configured to encode spatial information in the set of color descriptors and the set of fixed-orientation texture descriptors.

13. The system of claim 12, wherein the spatial information comprises scale and location information, and wherein to score the set of images, the image analysis module is configured to determine differences between the position of a feature of the query image and a position of a corresponding feature in each of the set of images.

14. The system of claim 9, wherein to perform the rotated local BoF operation, the image analysis module is configured to score, for each of the images in the set of images, one or more regions that have similarity to at least one of the rotated query images based on a user-weighted combination of color and texture.

15. A non-transitory computer-readable storage medium comprising stored program instructions that are computer-executable to implement:

characterizing each image in a set of images with a set of fixed-orientation texture descriptors, and a set of color descriptors;

indexing the set of images in a color index comprising the set of color descriptors for each image of the set of images and in a texture index comprising the set of fixed-orientation texture descriptors for each image of the set of images, the indexing comprising encoding spatial information in the set of color descriptors and in the set of fixed-orientation texture descriptors, the spatial information including feature location and scale as encoded in both the set of color descriptors and in the set of fixed-orientation texture descriptors;

characterizing a query image with the set of fixed-orientation texture descriptors of the query image, the set of fixed-orientation texture descriptors of the query image comprising a set of fixed orientation descriptors for each of a set of rotated query images, and with a set of color descriptors of the query image;

performing a rotated local Bag-of-Features (BoF) operation upon the set of rotated query images and the set of images; and ranking each of the set of images based on the rotated local Bag-of-Features operation.

16. The non-transitory computer-readable storage medium of claim 15, wherein to implement said characterizing each image, the program instructions implement:

extracting from each image of the set of images a set of sparse feature regions and a set of dense feature regions;

calculating a texture descriptor for each of the set of sparse feature regions and each of the set of dense feature regions; and calculating a color descriptor for each of the set of sparse feature regions and each of the set of dense feature regions.

17. The non-transitory computer-readable storage medium of claim 15, wherein to implement said indexing the set of images, the program instructions implement:

building based on the set of color descriptors the color index as an inverted file; and separately building based on the set of fixed orientation texture descriptors the texture index as another inverted file.

18. The non-transitory computer-readable storage medium of claim 15, wherein to implement said characterizing the query image, the program instructions implement:

generating the set of rotated query images that represents the query image as transformed through at a set of rotation angles;

calculating the set of fixed orientation texture descriptors of the query image from the set of rotated query images; and calculating for the query image a color descriptor.

19. The non-transitory computer-readable storage medium of claim 18, wherein the program instructions implement extracting from the query image a set of sparse feature regions of fixed orientation and a set of dense feature regions of fixed orientation, and wherein to implement said calculating the set of fixed orientation texture descriptors of the query image, the program instructions implement calculating for each transformed query image of the set of rotated query images:

a set of texture descriptors for the each of the set of sparse feature regions; and a set of texture descriptors for the each of the set of dense feature regions.

20. The non-transitory computer-readable storage medium of claim 15, wherein to implement said performing the rotated local BoF operation, the program instructions implement scoring, for each of the images in the set of images, one or more regions that have similarity to at least one of the rotated query images.

\* \* \* \* \*